(12) United States Patent
Arora et al.

(10) Patent No.: US 6,890,987 B2
(45) Date of Patent: May 10, 2005

(54) PRODUCT FOR VAPOR DEPOSITION OF FILMS OF AMPHIPHILIC MOLECULES OR POLYMERS

(75) Inventors: Pramod K. Arora, North Royalton, OH (US); Brij P. Singh, North Royalton, OH (US)

(73) Assignee: nanoFilm, Ltd., Valley View, OH (US)

( * ) Notice: Subject to any disclaimer, the term of this patent is extended or adjusted under 35 U.S.C. 154(b) by 120 days.

(21) Appl. No.: 09/887,661

(22) Filed: Aug. 3, 2001

(65) Prior Publication Data

US 2002/0082329 A1 Jun. 27, 2002

(Under 37 CFR 1.47)

Related U.S. Application Data

(60) Provisional application No. 60/241,504, filed on Oct. 18, 2000.

(51) Int. Cl.$^7$ ............................. C08L 83/04; C08K 3/22
(52) U.S. Cl. ...................... 524/588; 524/430; 524/434; 524/437
(58) Field of Search ................................ 524/588, 430, 524/434, 437, 439

(56) References Cited

U.S. PATENT DOCUMENTS

| | | | |
|---|---|---|---|
| 3,898,090 A | * 8/1975 | Clark | 106/38.2 |
| 3,976,497 A | 8/1976 | Clark | 106/287 |
| 4,001,858 A | 1/1977 | Ballamy et al. | |
| 4,181,544 A | 1/1980 | Cho | |
| 4,330,360 A | 5/1982 | Kubiak et al. | |
| 4,460,639 A | * 7/1984 | Chi et al. | 442/178 |
| 4,539,061 A | 9/1985 | Sagiv | |
| 4,681,773 A | 7/1987 | Bean | |
| 4,800,100 A | 1/1989 | Herbots et al. | |
| 5,064,520 A | 11/1991 | Miyake et al. | |
| 5,078,791 A | 1/1992 | Singh et al. | |
| 5,166,000 A | 11/1992 | Singh et al. | |
| 5,173,365 A | 12/1992 | Singh et al. | |
| 5,204,126 A | 4/1993 | Singh et al. | |
| 5,219,654 A | 6/1993 | Singh et al. | |
| 5,300,561 A | 4/1994 | Singh et al. | |
| 5,415,912 A | * 5/1995 | Ushizaka et al. | 428/41.4 |
| 5,512,351 A | * 4/1996 | Miyamichi et al. | 428/195 |
| 5,616,532 A | * 4/1997 | Heller et al. | 502/242 |
| 5,766,698 A | 6/1998 | Singh et al. | |
| 5,897,918 A | 4/1999 | Singh et al. | |
| 6,099,971 A | 8/2000 | Faris et al. | 428/447 |
| 6,153,689 A | * 11/2000 | Itoh et al. | 524/588 |
| 2002/0031488 A1 | * 3/2002 | Kanji et al. | 424/70.121 |
| 2002/0045007 A1 | * 4/2002 | Arora et al. | 427/248.1 |
| 2003/0203110 A1 | * 10/2003 | Arora et al. | 427/248.1 |

FOREIGN PATENT DOCUMENTS

EP    0 963 797 A2    12/1999

WO    93 07224 A    4/1993

OTHER PUBLICATIONS

W.C. Bigelow et . al , "Oleophobic Monolayers,"Colloid Sci., 1,513–38 (1946).
E.E. Polymeropoulos et al, "Electrical Conduction Through Adsorbed Monolayers," J. Chem.Phys., 69, 1836–1847 (1978).
Cai, Chengzhi et al, "Self–Assembly in Ultrahigh Vacuum: Growth of Organic Thin Films with a Stable In–Plane Directional Order," J.Am. Chem. Soc., 120, 8563–8564 (1998).
Parikh, A.N. et al, "n–Alkylsiloxanes: From Single Monolayers to Layered Crystals," J.Am.Chem. Soc., 119, 3135–3143 (1997).
Baney, Ronald H., et al, "Silsesquioxanes," Chem. Rev., 95, 1409–1430 (1995).
Loy,Douglas A., et al, "Bridged Polysilsesquioxanes," Chem. Rev., 95, 1431–1442 (1995).
Forrest,Stephen R., "Ultrathin Organic Films Grown by Organic Molecular Beam Deposition and Related Techniques," Chem. Rev., 119, 1793–1896 (1997).
Lee, Lieng–Huang, "Wettability and Conformation of Reactive Polysiloxanes," J.Colloid & Interface Sci., 27, 751–760 (1968).
Peri,J.B., "Infrared study of OH and $NH_2$ Groups on the Surface of a Dry Silica Aerogel," J. Phys. Chem., 70, 2937–2945 (1966).
Armistead, C.G. et al, "Reactions of Chloromethyl Silanes with Hydrated Aerosil Silicas," Trans. Faraday. Soc., 63, 2549–2556 (1967).
Hair, Michael L. et al, "Reactions of Chlorosilanes with Silica Surfaces," J. Phys. Chem., 73, 2372–2378 (1969).
Tripp, C.P. et al, " Reaction of Chloromethylsilanes with Silica," Langmuir, 7, 923–927 (1991).
Tripp, C.P. et al, "Effect of Fluoroalkyl Substituents on the Reaction of Alkylchlorosilanes with Silica Surfaces," Langmuir, 9, 3518–3522, (1993).
Hoffman, Patrick W. et al, "Vapor Phase Self–Assembly of Flourinated Monolayers on Silicon and Germanium Oxide," Langmuir, 13, 1877–1880 (1997).
Parikh A N et al: "n–Alkylsiloxanes: From Single Monolayers to Layered Crystals", Journal of the American Chemical Society, vol. 119, 1997, pp. 3135–3143.

* cited by examiner

Primary Examiner—Jeffrey B. Robertson
(74) Attorney, Agent, or Firm—Jones Day

(57) ABSTRACT

A solid composition having a solid state film forming substance mixed with an inert carrier. The composition is heated in a vacuum chamber to evaporate the film forming substance by sublimation to form a molecular beam of amphiphilic molecules which settle on a substrate surface within the chamber and bond thereto while self-assembling into a thin film.

84 Claims, 1 Drawing Sheet

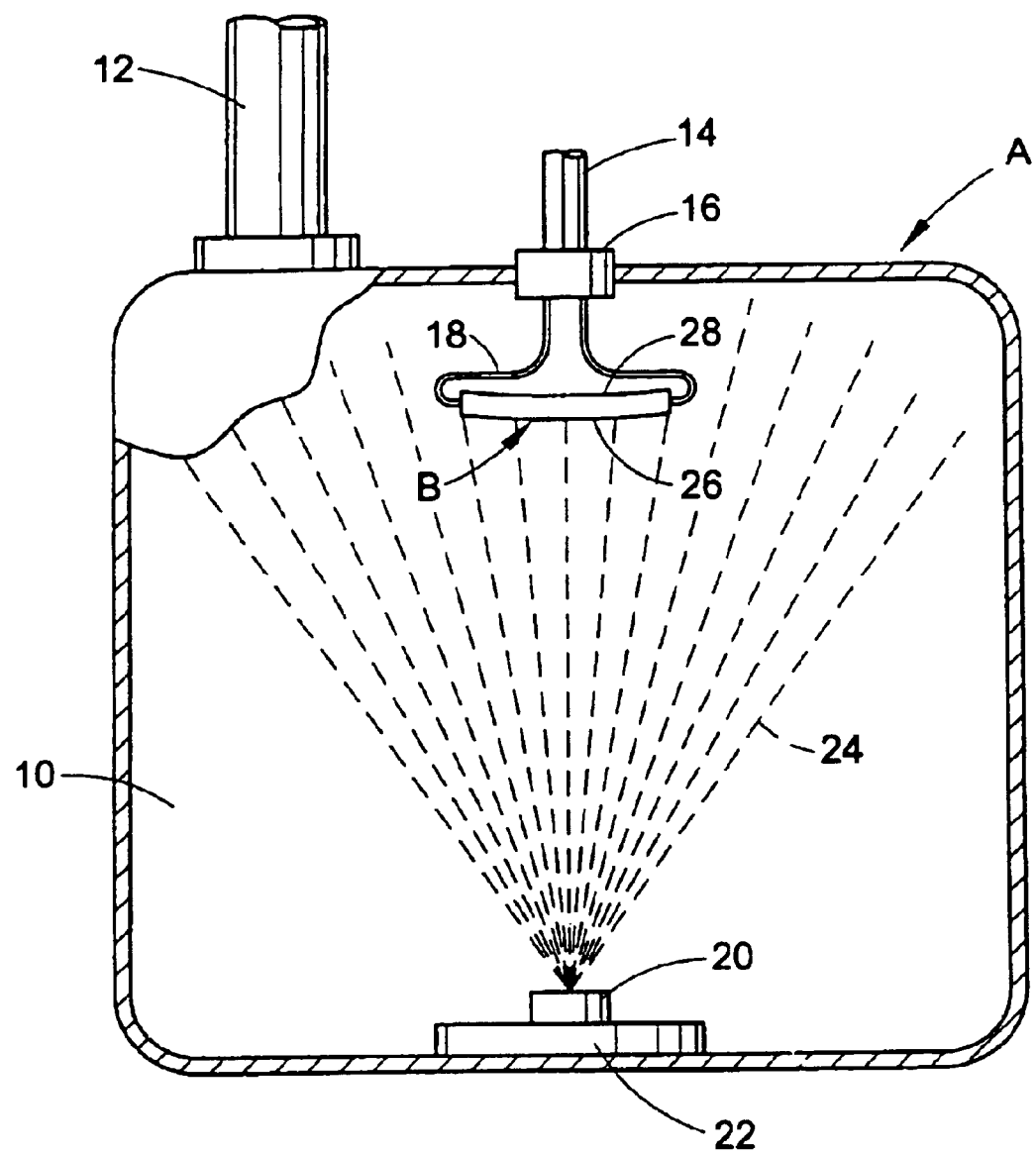

PRODUCT FOR VAPOR DEPOSITION OF FILMS OF AMPHIPHILIC MOLECULES OR POLYMERS

RELATED APPLICATIONS

This application claims subject matter disclosed in U.S. provisional application Ser. No. 60/241,504 filed Oct. 18, 2000, the benefit of the filing date of which is hereby claimed.

BACKGROUND OF THE INVENTION

This application relates to the art of film forming compositions and to methods for applying films to substrates. The invention is particularly applicable to film forming compositions that contain solid state alkylsilsesquioxane polymers and to methods for applying such polymers to substrates, and will be described with particular reference thereto. However, it will be appreciated that the application has broader aspects and that at least certain features can be used with other polymers and methods.

Polymerizable amphiphilic molecules having the intrinsic ability to self-assemble into a thin film are well known in both solution phase and gas phase. By way of example, descriptions of such materials and their ability to form thin films are contained in: W. C. Bigelow et al, J. Colloid. Sci., 1, 513–538 (1946); L. H. Lee, J. Colloid. & Interface Sci., 27, 751–760 (1968); E. E. Polymeropoulos et al, J. Chem. Phys., 69, 1836–1847 (1978); J. Sagiv, U.S. Pat. No. 4,539,061; J. Phys. Chem. 70, 2937 (1966); Trans. Faraday. Soc., 63, 2549 (1967); J. Phys. Chem., 73, 2372 (1969); Langmuir, 7, 923 (1991); Langmuir, 9, 3518 (1993) and Langmuir, 13, 1877 (1997). Disclosures of molecular beam deposition of coatings on substrates are found in the following U.S. Pat. Nos. 4,001,858; 4,181,544; 4,330,360; 4,681,773; 4,800,100; and 5,064,520. The disclosures of these publications and patents are hereby incorporated herein by reference. Compositions and methods for applying hydrophobic ultra thin films of self-assembling amphiphilic molecules to substrates are described in commonly assigned U.S. Pat. Nos. 5,078,791; 5,166,000; 5,173,365; 5,204,126; 5,219,654; 5,300,561; 5,766,698; and 5,897,918. The disclosures of these patents are hereby incorporated herein by reference.

Use of the compositions and methods disclosed in the above literature and patents typically results in the formation of a mono-layer thin film on a substrate surface. Intermolecular interactions in both solution phase and gas phase under a low vacuum make it difficult to use these compositions and methods to form multi-layer films. In addition, the use of these compositions requires cleaning of the substrate surface and/or the vacuum chamber after formation of the film.

Compositions and methods disclosed in the above literature and patents are very sensitive to moisture, and require special packaging, handling and processing. These prior art processes also expose the entire substrate surface to the film forming substance and result in a film over the entire surface of the substrate. There is no choice of selecting a certain substrate surface or shape for film formation other than by masking.

In the compositions and methods disclosed in the above literature and patents, highly reactive self-assembling amphiphilic monomer substances are used to form the films. It would be desirable if these monomers could be partially polymerized to reduce their high reactivity to moisture while still being capable of acting as self-assembling amphiphilic molecules to form thin films.

Compositions with organic polymer molecules and self-assembling amphiphilic polymer substances for use in forming multi-layer thin films have been reported in the literature. By way of example, silsesquioxanes made from different monomer silanes and alkylsilanes are disclosed in Chem. Rev., 95 1431–1442 (1995) and Chem. Rev., 95, 1409–1430 (1995), and references cited therein and in J. Am. Chem. Soc., 119, 3135–3143 (1997). The disclosures of these publications are hereby incorporated herein by reference.

Methods for applying multi-layer thin films of organic polymers and self-assembling amphiphilic polymer substances inside ultra high vacuum chambers are known in the fields of optoelectronics, flat panel displays, thin film transistors and lasers as disclosed in J. Am. Chem. Soc., 120, 8563–8564 (1998) and Chem. Rev., 97, 1793–1896 (1997), and references cited therein. The disclosures of these publications are hereby incorporated herein by reference.

Use of the above methods and compositions requires the use of materials having extremely high purity. Therefore, a very complicated purification procedure is required that includes the use of a vacuum chamber at an ultra high vacuum of $1 \times 10^{-7}$ to $1 \times 10^{-11}$ torr.

It would be desirable to have a process and composition for use in applying hydrophobic thin films of self-assembling amphiphilic polymer substances to surfaces in a manner that is very fast, efficient and cost effective. It also would be desirable to have a process that is capable of coating only one surface at a time with a film of controlled thickness. It also would be desirable to have a process that could be used at a much lower vacuum than the ultra high vacuum mentioned in the previous references. It also would be desirable to have a process where cleaning of the excess coating material inside the vacuum chamber automatically takes place during the coating process. It would be desirable to have a coating composition of self-assembling amphiphilic polymer substances that is easy to handle and use. It also would be desirable to have a composition that is very stable at room temperature and humidity, and does not require special protection from temperature or moisture. It would be yet another desirable characteristic to have a composition and process that is user friendly and environmentally safe. It would be another desirable characteristic to have a composition and process in which a single component material of very high purity is not required. It further would be desirable to have a coating composition that is easy to dispose of after it has been used.

SUMMARY OF THE INVENTION

In accordance with the present application a stable solid state coating composition includes a solid state film forming polymer having self-assembling amphiphilic molecules. In one arrangement, the film forming polymers are alkylsilsesquioxanes which are prepared in accordance with known procedures, such as disclosed in J. Am. Chem. Soc., 119, 3135–3143 (1997), the disclosure of which is hereby incorporated herein by reference.

A pure film forming substance in accordance with the present application evaporates very rapidly when heated and this makes it difficult to control the thickness of a film that is formed by the evaporated molecules. Therefore, the film forming substance preferably is mixed with an inert carrier, such as a metal oxide, that is stable at high temperatures and does not react with moisture or with the film forming substance.

The composition of film forming polymer powder mixed with a metal oxide powder is compressed into a tablet or compressed into a metal cup. The film forming polymer preferably is 10–50% by weight of the composition.

The amount of film forming substance in the composition that is compressed into a tablet or compressed into a metal cup usually is in the range of 0.5 to 5.0 grams, and more preferably 0.5 to 1.0 grams. Obviously, larger or smaller amounts may be used for some purposes.

When a metal cup is used and packed with compressed composition according to the present application, the volume of the cup usually is 0.5 to 2.0 milliliters. Obviously, other sizes may be used for some purposes.

A substrate is coated with a thin film of amphiphilic molecules in accordance with the present application by placing the composition of the present application in a vacuum chamber with a substrate to be coated. A high vacuum of $1 \times 10^{-4}$ to $1 \times 10^{-6}$ torr is established and maintained within the vacuum chamber during the coating process. When the desired vacuum is established, the composition is heated within the vacuum chamber to evaporate the film forming substance from a solid state to a vapor state by sublimation. The evaporated material forms a molecular beam of amphiphilic molecules that settle on the substrate surface and self-assemble into a continuous thin film that bonds to the substrate surface. The thickness of the film is controlled by the evaporation rate of the film forming substance and time.

A variety of different substrate materials can be coated with thin films of amphiphilic polymer molecules by using the method and composition of the present application. Suitable substrate materials include, but are not necessarily limited to, glass, ceramic, porcelain, plastics, glass or plastic lenses, glass slides, sun glasses, safety glasses, precision optical parts, lenses with anti-reflective coatings, or flat sheets or other surfaces, and certain polished metal surfaces such as silicon, aluminum, germanium, chromium, titanium and zirconium.

It is a principal object of the present invention to provide an improved coating composition that contains a solid state film forming substance of amphiphilic molecules for use in providing hydrophobic thin films on substrate surfaces.

It is also a principal object of the invention to provide an improved method for providing hydrophobic thin films on substrate surfaces.

It is another object of the invention to provide a method that permits coating of substrate surfaces one side at a time.

It is a further object of the invention to provide a method that can be used to provide substrate surfaces with multilayer self-assembled films of controlled thickness.

It is also an object of the invention to provide a method that does not require an ultra high vacuum.

It is an additional object of the invention to provide a composition of the type described that is easy to handle, transport and use.

It is another object of the invention to provide such a composition that is very stable at normal temperature and humidity.

It is yet another object of the invention to provide a method and composition that is user friendly and environmentally safe.

It is also an object of the invention to provide a method wherein excess coating material is removed from the vacuum chamber during the coating process.

It is also an object of the present invention to provide a coating composition that is easy and safe to dispose of.

It is also an object of the invention to use a mixture of amphiphilic polymers to create good hydrophobic films on surfaces.

BRIEF DESCRIPTION OF THE DRAWING

The drawing is a diagrammatic illustration of a vacuum chamber in which the coating method of the present application is carried out.

DESCRIPTION OF REPRESENTATIVE EMBODIMENTS

It will be understood that the explanations provided herein are for purposes of disclosing representative embodiments of the invention and not for purposes of limiting same.

As used in the context of this application, a film forming substance is one containing amphiphilic polymeric molecules that are capable of self-assembly on a substrate surface and of bonding thereto by virtue of the high affinity that the polar groups in the polymeric molecules have for the polar groups on the substrate surface. An amphiphile contains a polar region and a non-polar region, and amphiphiles that can be used to form film in accordance with the present application include, but are not necessarily limited to, the following:

The polar segment of the amphiphile can be a corboxylic acid, alcohols, thiols, amides, primary, secondary, tertiary amines, silane derivatives and sulfonates.

The non-polar or apolar component typically consists mainly of alkyl and alkyl ether or fluorinated alkyl and alkyl ether groups. The alkyl chain also may have other polymerizable moieties in it.

In one arrangement, the film forming substance is prepared by the hydrolysis and polymerization of monomers using known procedures as disclosed in the aforementioned literature. The typical monomers used in the present application consist essentially of RmSiXn where the non-polar R is a substituted silane or siloxane, or an alkyl, a per-fluorinated alkyl, an alkyl ether, or a per-fluorinated alkyl ether group of 6–20 carbon atoms and most preferably 10–20 carbon atoms, where X is selected from the group consisting of halogens, hydroxy, alkoxy and acetoxy groups, and where m is 1–3, n is 1–3 and m+n equal 4.

In another example, the monomer used to make the stable solid state film forming alkylsilsesquioxane polymer is RmSiXn, where R is $C_{18}$, X is an ethoxy group, m is 1–3, n is 1–3 and m+n equal 4.

By way of example, octadecyltrichlorosilane is used to make a stable solid state film forming amphiphilic polymer substance. Octadecyltrichlorosilane is added dropwise to a stoichometric excess of water held at about 5° C. and with good stirring. In the beginning, the material hydrolyzes and suspends in the water solution. After about 15 minutes it rises to the top of the water as a white flaky material and is left standing for 30–45 minutes. The precipitate is collected by suction filtration, thoroughly washed with water to remove residual hydrochloric acid, and dried under a vacuum at room temperature which usually is in the range of 18–32° C. A mixture of different siloxane polymers is obtained as mentioned in the literature, and the polymers still have some unreacted active hydroxy groups.

The white flaky material is then heated at 160–180° C. for 1 hour at a vacuum not lower than $1 \times 10^{-2}$ to $5 \times 10^{-2}$ torr. A lower vacuum would be $1 \times 10^{-1}$ torr, and higher vacuums would be $1 \times 10^{-3}$ to $1 \times 10^{-7}$. During this process, most of the residual water and possibly the water between different polymer layers is removed. This step is necessary to obtain a polymer that provides a very uniform film deposition rate in the high vacuum process. Without this dehydration step, the deposition rate is not constant due to the release of excess water from the substance during the coating process. However, it is not desirable to obtain nearly 100% dehydration as might be obtained if the vacuum and/or temperature are too high, or if the dehydration time is too long.

The cooled solid polymer material is crushed to a fine powder and mixed with an inert binder such as a metal oxide powder to obtain a homogeneous mixture. Titanium dioxide powder, such as P25 available from Degussa Corporation, is a suitable binder. Other binders that may be useable include silica and alumina. The important characteristic of the binder is that it should be one that does not react to moisture or with the film forming substance, and is stable at high temperatures of 300° C. and greater so that it does not evaporate when the composition is heated to evaporate the film forming polymer by sublimation.

The thoroughly mixed polymer powder and metal oxide powder are combined so that the polymer powder is 10–50% by weight of the composition, more preferably 20–40% by weight of the composition, and most preferably 25–30% by weight of the composition. The homogeneous mixture is compressed into a tablet or placed in a container such as a small metal cup and compressed therein. The tablet or the homogeneous mixture compressed into the cup is used inside the vacuum chamber for coating substrates with thin films. The metal cup may be of such metals as copper, aluminum and tin, but is not necessarily limited thereto.

In the method of the present application, substrates to be coated are placed inside the vacuum chamber, along with the composition of the present application, and a high vacuum of $1 \times 10^{-4}$ to $1 \times 10^{-6}$ torr is established inside the vacuum chamber. The substrate preferably is rotated while the composition is heated to evaporate the solid state film forming substance by sublimation. This establishes a molecular beam of amphiphilic molecules which settle on the substrate surface and attach or bond thereto by way of covalent bonding, hydrogen bonding and/or van der Waals forces while self-assembling into a continuous thin film. The rate of the deposition is set at 0.1–1.0 nm/sec by controlling the heat and evaporation rate, and is monitored by the use of an optical balance located within the vacuum chamber or by other deposition rate monitors such as a vacuum microbalance or quartz-crystal oscillator. A multi-layer thin film having a uniform thickness of 3–100 nm may be obtained. When the film has reached the desired thickness, heating of the coating composition is stopped and the chamber is vented so that the coated substrates can be removed. This method provides a very uniform hydrophobic thin film on substrate surfaces.

The method of the present application may be used to provide a thin film over other coatings such as anti-reflective coatings and mirror coatings. For example, the composition of the present application may be placed within a vacuum chamber at the same time as a composition for forming an anti-reflective coating or a mirror coating. The anti-reflective or mirror coating is first evaporated to provide the substrates, such as lenses, with an anti-reflective or mirror coating. The composition of the present application then is evaporated to provide a continuous thin film over the anti-reflective coating or mirror coating. Thus, the substrate is sequentially coated with different films without removing it from the vacuum chamber.

A vacuum chamber used to practice the method of the present application may be of the type manufactured by Satis, Denton or Zeiss for use in depositing anti-reflective coatings on lenses. The metal cup containing the composition may be heated with an electron beam gun, a resistance heater, an induction heater or another heat source. The tablet may be placed in a crucible within the vacuum chamber and similarly heated to evaporate the solid state film forming substance by sublimation. Preferably, neither the substrate nor the vacuum chamber are heated before or during the deposition process, and the only heat produced within the chamber is that used to evaporate the film forming substance. Thus, the temperature within the vacuum chamber during the entire process normally is well below 100° C.

The drawing shows a typical vacuum chamber A having a suitable door for providing access to the interior 10 thereof in a known manner. A conduit 12 communicating with the vacuum chamber interior 10 is connected with a vacuum pump for establishing and maintaining a desirable vacuum within the vacuum chamber.

A rotatable shaft 14 extends through a packing gland 16 to interior 10 of chamber A and has a mechanical gripping device 18 thereon for gripping the outer periphery of a substrate B. Any of the known mechanical clips and holders may be used for holding one or more substrates to be coated, as well as vacuum holders in which one or more substrates, such as lenses, are held to a rotatable support by a vacuum acting on the rear surfaces of the substrates, the vacuum being applied through a hollow shaft 14 and a plurality of spaced-apart ports in a hollow disc holder.

A metal cup 20 containing the composition of the present application, or a crucible holding a composition tablet, is positioned on a support 22 having a suitable heater associated therewith for heating the composition to a temperature of 100–300° C. and more preferably 150–200° C. After establishing a desirable vacuum of $1 \times 10^{-4}$ to $1 \times 10^{-6}$ torr in the vacuum chamber, the heater is energized and the solid state film forming substance in the composition evaporates by sublimation to form a molecular beam 24 of amphiphilic molecules which settle on substrate surface 26 that faces toward the source 20 of the molecular beam. The opposite surface 28 of the substrate B is not coated with the film forming substance. The amphiphilic molecules settle on substrate surface 26 and bond thereto as by covalent bonding, hydrogen bonding and/or van der Waals forces while simultaneously self-assembling into a continuous thin film. The operation is continued for a period required to form a desired film thickness. The chamber is then vented and the coated substrates are removed.

Controlling the heat source used to evaporate the film forming substance controls the evaporation rate which in turn controls the deposition rate of the amphiphilic molecules on the substrate surface. The percent of film forming substance in the composition also may be varied to vary the evaporation and deposition rates.

The substrate preferably is located between the source of the molecular beam and the vacuum port with the surface to be coated facing toward the molecular beam so that the molecules in the beam engage the substrate surface as they travel toward the vacuum port. The substrate is rotated at a rate of one revolution per 1–10 seconds (6–60 revolutions per minute), and more preferably one revolution per 2–5 seconds (12–30 revolutions per minute). Removal of excess coating material from the substrate or the vacuum chamber is not necessary. The used composition cup or tablet is simply removed and replaced for coating a new batch of substrates.

By way of example, the film forming substance that is made from $R_mSiX_n$ may be one in which R is an alkyl chain containing 12 carbon atoms and X is Cl. R also may be a per fluorinated alkyl group containing 12 carbon atoms. R also may be a per fluorinated alkyl chain with X being chloride. R also may be an alkyl chain with 16 carbon atoms. A mixture of different monomers containing alkyl chains ranging from 6 to 12 carbon atoms may be hydrolyzed to provide a film forming substance that is a mixture of different materials that are then mixed with an inert binder powder. Durable and uniform films with excellent hydrophobic properties are obtained using such materials.

Although the invention has been shown and described with reference to representative embodiments, it is obvious that alterations and modifications will occur to others skilled in the art upon reading and understanding of this application. Therefore, it is to be understood that the invention may be practiced otherwise than as specifically described herein while remaining within the scope of the claims.

We claim:

1. A composition that includes a solid state film forming substance and an inert binder pressed into a tablet, said film forming substance being an alkylsilsesquioxane polymer.

2. The composition of claim 1 wherein 10–50% by weight of said composition is said film forming substance.

3. The composition of claim 1 wherein said binder is a metal oxide.

4. A composition that includes a solid state film forming substance and an inert binder pressed into a metal cup, said film forming substance being an alkylsilsesquioxane polymer.

5. A composition that includes a solid state film forming alkylsilsesquioxane polymer and an inert binder, said alkylsilsesquioxane polymer being derived from RmSiXn, where R is $C_{18}$, X is an ethoxy group, m is 1–3, n is 1–3 and m+n equal 4.

6. A composition that includes a solid state film forming alkylsilsesquioxane polymer and an inert binder, said alkylsilsesquioxane polymer being derived from octadecyltrichlorosilane.

7. A solid state composition consisting essentially of a solid state inert binder that carries a heat vaporizable, solid state alkylsilsesquioxane polymer.

8. A composition that includes a solid state film forming alkylsilsesquioxane polymer and an inert binder, said alkylsilsesquioxane polymer being derived from RmSiXn, where R is non-polar and is a substituted silane or siloxane, an alkyl, a per-fluorinated alkyl, an alkyl ether, or a per-fluorinated alkyl ether group of 6–20 carbon atoms, where X is selected from the group consisting of halogens, hydroxy, alkoxy and acetoxy groups, and where m is 1–3, n is 1–3 and m+n equal 4.

9. A composition that includes a solid state film forming alkylsilsesquioxane polymer carried by a solid state tablet of inert material.

10. The composition of claim 9 wherein 10–50% by weight of said composition is said alkylsilsesquioxane polymer.

11. The composition of claim 9 wherein the alkylsilsesquioxane polymer is present in an amount of 0.5–5.0 grams.

12. The composition of claim 9 wherein the alkylsilsesquioxane polymer is present in an amount of 0.5–1.0 grams.

13. The composition of claim 9 wherein said alkylsilsesquioxane polymer is a powder mixed with said inert material.

14. The composition of claim 9 wherein said alkylsilsesquioxane polymer is dehydrated.

15. The composition of claim 9 wherein said alkylsilsesquioxane polymer is in a solid state.

16. A product consisting essentially of a solid state film forming alkylsilsesquioxane polymer carried by a tablet of solid state inert material.

17. The product of claim 16 wherein said film forming alkylsilsesquioxane polymer is derived from RmSiXn where R is non-polar and is a substituted silane or siloxane, an alkyl, a per-fluorinated alkyl, an alkyl ether, or a per-fluorinated alkyl ether group of 6–20 carbon atoms, where X is selected from the group consisting of halogens, hydroxy, alkoxy and acetoxy groups, and where m is 1–3, n is 1–3 and +n equal 4.

18. The product of claim 16 wherein said alkylsilsesquioxane polymer is derived from RmSiXn, where R is $C_{18}$, X is an ethoxy group, m is 1–3, n is 1–3 and m+n equal 4.

19. The product of claim 16 wherein said alkylsilsesquioxane polymer is derived from alkylchlorosilanes.

20. The product of claim 16 wherein said alkylsilsesquioxane polymer is derived from RmSiXn where R is an alkyl an alkyl ether a fluorinated alkyl or a fluorinated alkyl ether chain containing C6–C20, where X is Cl, Br, I, an alkoxy group or an acetoxy group, and where m is 1–3, n is 1–3 and m+n equal 4.

21. The product of claim 16 wherein said alkylsilsesquioxane polymer is derived from octadecyltrichlorosilane.

22. The product of claim 16 wherein said alkylsilsesquioxane polymer is dehydrated.

23. The product of claim 16 wherein said alkylsilsesquioxane polymer comprises 10–50% by weight of the combined solid state inert material and the alkylsilsesquioxane polymer.

24. The product of claim 16 wherein the alkylsilsesquioxane polymer is present in an amount of 0.5–5.0 grams.

25. The product of claim 16 wherein the alkylsilsesquioxane polymer is present in an amount of 0.5–1.0 grams.

26. The product of claim 16 wherein said alkylsilsesquioxane polymer is a powder mixed with said solid state inert material.

27. The product of claim 16 wherein said tablet is a compressed mixture of said alkylsilsesquioxane polymer and said solid state inert material.

28. The product of claim 16 wherein said solid state inert material is particulate and is compressed into a tablet, and said alkylsilsesquioxane polymer is distributed at least partially in the tablet.

29. The product of claim 28 wherein the tablet is a compressed mixture of said solid state inert material and said alkylsilsesquioxane polymer.

30. A product consisting essentially of a compressed solid state inert material that contains a solid state alkylsilsesquioxane polymer film forming substance.

31. The product of claim 30 wherein at least said solid state inert material is compressed into a cup.

32. The product of claim 31 wherein said cup is of metal.

33. The product of claim 31 wherein both said solid state inert material and said alkylsilsesquioxane polymer film forming substance are compressed into the cup.

34. The product of claim 30 wherein at least said solid state inert material is compressed into a tablet.

35. The product of claim 30 wherein the solid state inert material is particulate.

36. The product of claim 30 wherein both the solid state inert material and the alkylsilsesquioxane polymer are particulate.

37. The product of claim 30 wherein said alkylsilsesquioxane polymer is dehydrated.

38. The product of claim 30 wherein said compressed inert material is particulate and said alkylsilsesquioxane polymer is at least partially distributed therein.

39. The product of claim 30 wherein the alkylsilsesquioxane polymer is present in an amount of 0.5–5.0 grams.

40. A product for use in providing a film on a substrate surface comprising: a solid state alkylsilsesquioxane polymer film forming substance carried by a tablet of solid state inert material that is not present in a film that is provided on a substrate with the product.

41. The product of claim 40 wherein said alkylsilsesquioxane polymer is derived from RmSiXn where R is nonpolar and is a substituted silane or siloxane, an alkyl, a per-fluorinated alkyl, an alkyl ether, or a per-fluorinated alkyl ether group of 6–20 carbon atoms, where X is selected from the group consisting of halogens, hydroxy, alkoxy and acetoxy groups, and where m is 1–3, n is 1–3 and m+n equal 4.

42. The product of claim 40 wherein said alkylsilsesquioxane polymer is derived from RmSiXn, where R is $C_{18}$, X is an ethoxy group, m is 1–3, n is 1–3 and m+n equal 4.

43. The product of claim 40 wherein said alkylsilsesquioxane polymer is derived from alkylchlorosilanes.

44. The product of claim 40 wherein said alkylsilsesquioxane polymer is derived from RmSiXn where R is an alkyl an alkyl ether a fluorinated alkyl or a fluorinated alkyl ether chain containing C6–C20, where X is Cl, Br, I, an alkoxy group or an acetoxy group, and where m is 1–3, n is 1–3 and m+n equal 4.

45. The product of claim 40 wherein said alkylsilsesquioxane polymer is derived from octadecyltrichlorosilane.

46. The product of claim 40 wherein said alkylsilsesquioxane polymer is dehydrated.

47. The product of claim 40 wherein said alkylsilsesquioxane polymer is in a solid state.

48. The product of claim 40 wherein said alkylsilsesquioxane polymer comprises 10–50% by weight of the combined solid state inert material and the alkylsilsesquioxane polymer.

49. The product of claim 40 wherein the alkylsilsesquioxane polymer is present in an amount of 0.5–5.0 grains.

50. The product of claim 40 wherein the alkylsilsesquioxane polymer is present in an amount of 0.5–1.0 grams.

51. The product of claim 40 wherein said alkylsilsesquioxane polymer is a powder mixed with said solid state inert material.

52. The product of claim 40 wherein said tablet is a compressed mixture of said alkylsilsesquioxane polymer and said solid state inert material.

53. The product of claim 40 wherein said solid state inert material is particulate and is compressed into the tablet, and said alkylsilsesquioxane polymer is distributed at least partially in the tablet.

54. The product of claim 53 wherein the tablet is a compressed mixture of said solid state inert material and said alkylsilsesquioxane polymer.

55. A product for providing a film on a substrate surface comprising: a body of inert material, at least a portion of said body having a solid state alkylsilsesquioxane polymer film forming substance interspersed therein, and said inert material being absent from a film that is provided on a substrate surface with the product.

56. The product of claim 55 wherein said product consists essentially of said body of inert material and said alkylsilsesquioxane polymer film forming substance.

57. The product of claim 55 wherein said alkylsilsesquioxane polymer is derived from RmSiXn where R is nonpolar and is a substituted silane or siloxane, an alkyl, a per-fluorinated alkyl, an alkyl ether, or a per-fluorinated alkyl ether group of 6–20 carbon atoms, where X is selected from the group consisting of halogens, hydroxy, alkoxy and acetoxy groups, and where m is 1–3, n is 1–3 and m+n equal 4.

58. The product of claim 55 wherein said alkylsilsesquioxane polymer is derived from RmSiXn, where R is $C_{18}$, X is an ethoxy group, m is 1–3, n is 1–3 and m+n equal 4.

59. The product of claim 55 wherein said alkylsilsesquioxane polymer is derived from alkylchlorosilanes.

60. The product of claim 55 wherein said alkylsilsesquioxane polymer is derived from RmSiXn where R is an alkyl an alkyl ether a fluorinated alkyl or a fluorinated alkyl ether chain containing C6–C20, where X is Cl, Br, I, an alkoxy group or an acetoxy group, and where m is 1–3, n is 1–3 and m+n equal 4.

61. The product of claim 55 wherein said alkylsilsesquioxane polymer is derived from octadecyltrichlorosilane.

62. The product of claim 55 wherein said alkylsilsesquioxane polymer is dehydrated.

63. The product of claim 55 wherein said alkylsilsesquioxane polymer comprises 10–50% by weight of the combined inert material and the alkylsilsesquioxane polymer.

64. The product of claim 55 wherein the alkylsilsesquioxane polymer is present in an amount of 0.5–5.0 grams.

65. The product of claim 55 wherein the alkylsilsesquioxane polymer is present in an amount of 0.5–1.0 grams.

66. The product of claim 55 wherein said alkylsilsesquioxane polymer is a powder.

67. The product of claim 55 wherein said product is a compressed mixture of said alkylsilsesquioxane polymer and said inert material.

68. The product of claim 55 wherein said inert material is particulate and is compressed into a tablet.

69. The product of claim 68 wherein the tablet is a compressed mixture of said inert material and said alkylsilsesquioxane polymer.

70. A product consisting essentially of a solid state alkylsilsesquioxane polymer film forming substance and a particulate solid state inert material.

71. A product consisting essentially of a solid state inert material having a solid state alkylsilsesquioxane polymer film forming substance at least partially interspersed therein.

72. A product for use in providing a film on a substrate surface comprising: a body of inert material, at least a portion of said body having a coating composition interspersed therein, said coating composition including a solid state alkylsilsesquioxane polymer film forming substance.

73. The product of claim 72 wherein said product consists essentially of said inert material and said coating composition.

74. The product of claim 72 wherein said coating composition consists essentially of said alkylsilsesquioxane polymer.

75. The product of claim 72 wherein said alkylsilsesquioxane polymer is derived from RmSiXn where R is nonpolar and is a substituted silane or siloxane, an alkyl, a per-fluorinated alkyl, an alkyl ether, or a per-fluorinated alkyl ether group of 6–20 carbon atoms, where X is selected from the group consisting of halogens, hydroxy, alkoxy and acetoxy groups, and where m is 1–3, n is 1–3 and m+n equal 4.

76. The product of claim 72 wherein said alkylsilsesquioxane polymer is derived from RmSiXn, where R is $C_{18}$, X is an ethoxy group, m is 1–3, n is 1–3 and m+n equal 4.

77. The product of claim 72 wherein said alkylsilsesquioxane polymer is derived from alkylchlorosilanes.

78. The product of claim 72 wherein said alkylsilsesquioxane polymer is derived from RmSiXn where R is an alkyl an alkyl ether a fluorinated alkyl or a fluorinated alkyl ether chain containing C6–C20, where X is Cl, Br, I, an alkoxy group or an acetoxy group, and where m is 1–3, n is 1–3 and m+n-n equal 4.

79. The product of claim 72 wherein said alkylsilsesquioxane polymer is derived from octadecyltrichlorosilane.

80. The product of claim 72 wherein said alkylsilsesquioxane polymer is dehydrated.

81. The product of claim 72 wherein said alkylsilsesquioxane polymer comprises 10–50% by weight of the combined inert material and the alkylsilsesquioxane polymer.

82. The product of claim 72 wherein the alkylsilsesquioxane polymer is present in an amount of 0.5–5.0 grams.

83. The product of claim 72 wherein the alkylsilsesquioxane polymer is present in an amount of 0.5–1.0 grams.

84. The product of claim 72 wherein said alkylsilsesquioxane polymer is a powder.

* * * * *

UNITED STATES PATENT AND TRADEMARK OFFICE
CERTIFICATE OF CORRECTION

PATENT NO.   : 6,890,987 B2
DATED        : May 10, 2005
INVENTOR(S)  : Pramod K. Arora and Brij P. Singh It is certified that error appears in the above-identified patent and that said Letters Patent is hereby corrected as shown below:

Column 9,
Line 35, change "grains" to -- grams --

Signed and Sealed this

Nineteenth Day of July, 2005

JON W. DUDAS
*Director of the United States Patent and Trademark Office*